United States Patent
Beaumel et al.

(10) Patent No.: US 11,767,874 B2
(45) Date of Patent: Sep. 26, 2023

(54) RETAINING DEVICE FOR A THREADED MEMBER, IN PARTICULAR FOR A NUT

(71) Applicant: JPB SYSTEME, Montereau-sur-le-Jard (FR)

(72) Inventors: Jonathan Beaumel, Vaires sur Marne (FR); Denis Messager, Melun (FR); Damien Marc, Blandy (FR)

(73) Assignee: JPB SYSTEME, Montereau-sur-le-Jard (FR)

( * ) Notice: Subject to any disclaimer, the term of this patent is extended or adjusted under 35 U.S.C. 154(b) by 518 days.

(21) Appl. No.: 16/970,541

(22) PCT Filed: Feb. 12, 2019

(86) PCT No.: PCT/EP2019/053412
§ 371 (c)(1),
(2) Date: Aug. 17, 2020

(87) PCT Pub. No.: WO2019/162146
PCT Pub. Date: Aug. 29, 2019

(65) Prior Publication Data
US 2021/0108670 A1 Apr. 15, 2021

(30) Foreign Application Priority Data
Feb. 20, 2018 (FR) ........................ 1851435

(51) Int. Cl.
*F16B 37/04* (2006.01)
(52) U.S. Cl.
CPC ............ *F16B 37/044* (2013.01); *F16B 37/04* (2013.01)

(58) Field of Classification Search
CPC ........ F16B 37/04; F16B 37/044; F16B 37/14; F16B 39/08; F16B 39/10; Y10S 411/91
(Continued)

(56) References Cited

U.S. PATENT DOCUMENTS 3,180,387 A * 4/1965 Dzus ..................... F16B 5/0208
411/968
4,227,561 A * 10/1980 Molina ................. F16B 37/044
411/103

(Continued)

FOREIGN PATENT DOCUMENTS

CN 205533703 U 8/2016
CN 106438637 A 2/2017
(Continued)

OTHER PUBLICATIONS

French Search Report from French Patent Application No. 1851435, dated Oct. 30, 2018.
(Continued)

*Primary Examiner* — Roberta S Delisle
(74) *Attorney, Agent, or Firm* — Greer, Burns & Crain, Ltd

(57) ABSTRACT

A nut is prevented from turning during screwing by a body attached to one of the parts to be tightened by rivets. The body prevents the nut from rotating via a ring coupled without clearance with the nut and coupled with radial clearance to the body, in order to allow the nut to self-position itself along the axis imposed on the screw by the bores traversed by the screw. The nut can thus be a standard nut or a floating cage nut. Application to the retaining of nuts that are inaccessible and/or require a high level of security against unintentional unscrewing.

19 Claims, 2 Drawing Sheets

(58) Field of Classification Search
USPC ...... 411/190–191, 372.5, 375, 429–431, 432
See application file for complete search history.

(56) References Cited

U.S. PATENT DOCUMENTS

| | | | | |
|---|---|---|---|---|
| 5,017,079 | A | * | 5/1991 | Reynolds .............. F16B 39/284 |
| | | | | 411/432 |
| 5,203,656 | A | * | 4/1993 | McKinlay .............. F16B 39/24 |
| | | | | 411/533 |
| 5,618,143 | A | | 4/1997 | Cronin, III et al. |
| 5,674,034 | A | * | 10/1997 | Bennett .................. F16B 39/10 |
| | | | | 411/197 |
| 7,101,135 | B2 | * | 9/2006 | Hassed ................. F16B 5/0216 |
| | | | | 411/432 |
| 8,393,839 | B2 | | 3/2013 | Savoy et al. |
| 8,469,460 | B2 | * | 6/2013 | Martin, III ............ F16C 19/548 |
| | | | | 301/124.1 |
| 9,752,610 | B2 | * | 9/2017 | Rousseau ................ F16B 39/12 |
| 2005/0084364 | A1 | * | 4/2005 | Tuszynski .............. B64G 1/645 |
| | | | | 411/432 |
| 2015/0063939 | A1 | * | 3/2015 | Marc ..................... F16B 39/282 |
| | | | | 411/6 |
| 2015/0292544 | A1 | * | 10/2015 | Rousseau ................ F01D 5/066 |
| | | | | 411/204 |

FOREIGN PATENT DOCUMENTS

| | | |
|---|---|---|
| JP | 2008530478 A | 8/2008 |
| JP | 2016-109277 A | 6/2016 |
| RU | 2235926 C2 | 9/2004 |
| WO | 2006/088363 A2 | 8/2006 |
| WO | 2011055077 A4 | 5/2011 |

OTHER PUBLICATIONS

International Search Report and Written Opinion for International Patent Application No. PCT/EP2019/053412, dated Apr. 26, 2019.
Search Report received in Russian Application No. 2020130587, dated Feb. 21, 2022. (Translation Provided).
First Office Action received in Chinese Application No. 201980013974.4 dated Jul. 1, 2021. (English Translation).
Search Report received in Chinese Application No. 201980013974.4 dated Jun. 25, 2021. (English Translation).

* cited by examiner

RETAINING DEVICE FOR A THREADED MEMBER, IN PARTICULAR FOR A NUT

BACKGROUND

The present invention relates to a retaining device for a threaded member, in particular for a nut.

In certain applications, in particular in aeronautical applications and even more particularly in aircraft engines, fastenings must be produced by screwing, despite one of the threaded members, typically a nut, being very difficult to access in order to be prevented from turning during the rotation of screwing or unscrewing of the other threaded member, for example a bolt.

There are known nuts that can be fastened in advance in an appropriate position for subsequent screwing. However, these nuts are often special, non-standard nuts. There is another problem with such nuts: when two parts must be fastened by several bolts, such nuts positioned fixed on one of the parts prevent any adjustment for dimensional tolerances of this part with respect to the other. There are also known nuts called "floating cage nuts", offered for example by Raceparts (UK) Ltd, Unit 3, Rockfort Ind. Est, Hithercroft Rd, Wallingford, UK, specially shaped to be coupled with a body—or cage—that is fixed in advance to one of the parts. Such special nuts pose problems of interchangeability and type approval in the most demanding applications, such as aeronautics.

An aim of the present invention is thus to propose a retaining device for a threaded member, in particular for a nut, which allows screwing without access to the threaded member, makes it possible to adjust for dimensional tolerances and allows, if desired, the use of standard threaded members, in particular standard nuts.

SUMMARY

According to the invention, the retaining device for a threaded member, in particular for a nut, for retaining said threaded member during a screwing operation with said threaded member along a screw axis, the threaded member comprising a linking shape with respect to rotations about the axis and bearing at least indirectly on a part to be tightened by screwing action, the device comprising a body intended to be fastened to the part and equipped with an anti-rotation shape capable of preventing the rotation of the threaded member with respect to the part while allowing radial clearance between the threaded member and the body, is characterized in that it also comprises an intermediate element comprising:

- a shape complementary to the linking shape, capable of producing a coupling opposing a relative rotation between the threaded member and the intermediate element, and
- coupling means capable of producing, with the anti-rotation shape of the body, a coupling with radial clearance opposing a relative rotation between the intermediate element and the body.

The intermediate element and the body cooperate to ensure the radial clearance allowing the threaded member to have freedom of positioning with respect to the part during screwing. It is therefore no longer necessary to make use of a threaded member that is specially designed so that it can be prevented from turning, while still having this self-locating freedom. A standard threaded member, in particular type-approved for the application in question, can be used.

In particular, in an embodiment, the coupling opposing a relative rotation between the threaded member and the intermediate element is substantially without radial clearance and/or substantially without rotational clearance about the axis. Thus, the linking shape of the threaded member efficiently cooperates with the intermediate element to prevent rotation of the threaded member, in particular during screwing and/or on completion thereof and/or during unscrewing. By "substantially without clearance" is meant that there can nevertheless be a minimal clearance of the kind necessary between a nut and a usual tool for screwing/unscrewing.

In certain preferred embodiments, the coupling with radial clearance between the intermediate element and the body also has rotational clearance about the axis. This rotational clearance allows or facilitates the radial displacement allowed by the radial clearance. In principle, it is limited to an angular stroke just sufficient to allow the free radial displacement allowed by the radial clearance.

Typically, the complementary shape borne by the intermediate element is designed to ensure said coupling with a standard nut linking shape.

In an embodiment, the complementary shape is a splined bore, in particular for coupling with an externally splined bolt head or nut of a standard model in certain industries such as the aeronautical industry.

Preferably, the intermediate element is a ring, capable of forming with the threaded member a coupling distributed all the way round the axis, typically in the manner of a screwing tool. If desired, this makes the device capable of preventing the rotation of the threaded member even if the screwing torque reaches the maximum value that the threaded member used is able to withstand.

In certain embodiments, the ring is closed, meaning that the material thereof is continuous all the way round the axis. In other embodiments, the substantially closed ring nevertheless has a slot, for example in an axial plane, making it possible to introduce an electro-discharge machining (EDM) wire into the opening in the ring during manufacturing, in order to machine said complementary shape in the wall of the bore.

Typically, the ring surrounds the threaded member and is surrounded by at least a part of the body.

Preferably, the intermediate element, in particular the ring, is essentially not capable of being deformed, in particular inelastic, meaning that the functionality thereof is not based on the deformation thereof, in particular the elasticity thereof.

Preferably, the coupling means are formed on a radially outer surface of the ring, said radially outer surface having said radial clearance with a radially inner surface of the body.

In a version, the coupling means between the intermediate element and the body comprise radial teeth projecting into recesses in a cylindrical wall, the teeth typically being borne by the intermediate element. In an embodiment, the recesses are then notches formed in an edge of the cylindrical wall, said edge pointing away from the part. Assembly of the device is thus facilitated, and its radial space requirement is reduced.

In an advantageous embodiment, a face of the recesses forms a stop limiting the axial movement of the intermediate element towards the part to be tightened. In particular, this face can be the base of the aforementioned notches.

The device preferably comprises axial retaining means retaining the intermediate element captive in the body. Thus, at least once installed, the body and the intermediate element form an inseparable whole. This inseparability is even obtained before assembly if the aforementioned stop limiting the axial movement of the intermediate element is also used.

In an embodiment, the axial retaining means comprise a stop firmly fixed to the body, retaining the intermediate element on side facing away from the part to be tightened. The stop is preferably borne by a cap fastened to the body, preferably by crimping. The cap can comprise a central aperture, for example to allow the passage of the free end of a bolt being screwed into the threaded member when the latter is a nut.

In another embodiment, the recesses are closed at the two axial ends thereof so as to retain the intermediate member in the body against movements in both directions, parallel to the axis.

BRIEF DESCRIPTION OF THE DRAWINGS

Other features and advantages of the invention will become more apparent from the description hereinafter, and/or from the attached drawings, in which.

DETAILED DESCRIPTION

Figure 1:
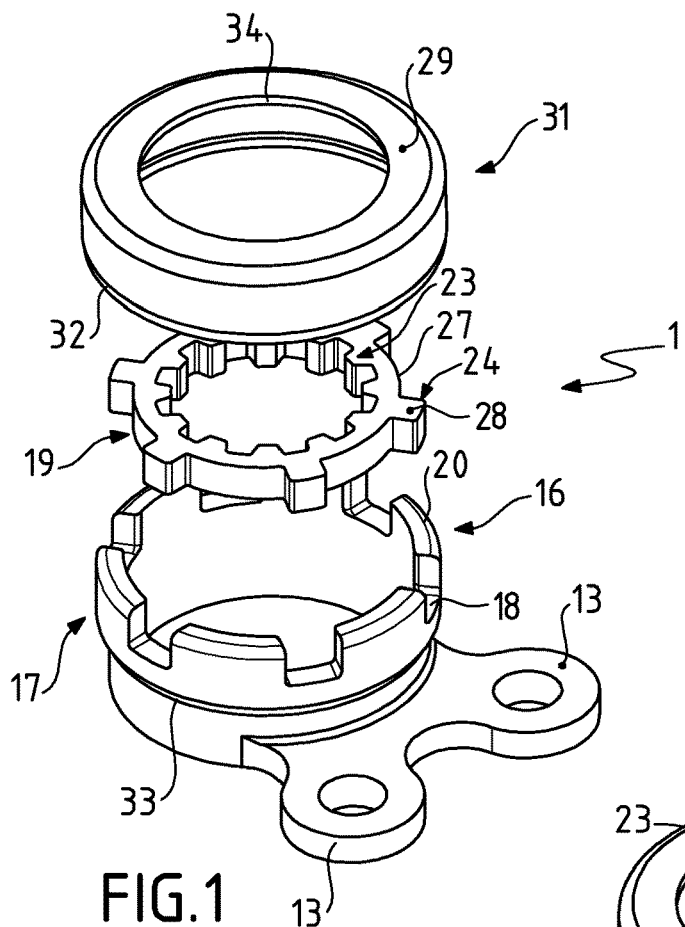
FIG. 1 is an exploded perspective view of the retaining device according to a first embodiment of the invention.
Figure 2:
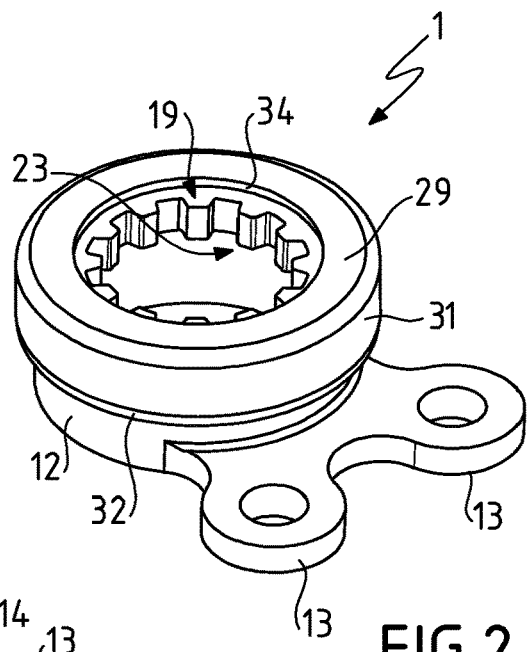
FIG. 2 is a view of the device in FIG. 1 in the assembled state.
Figure 3:
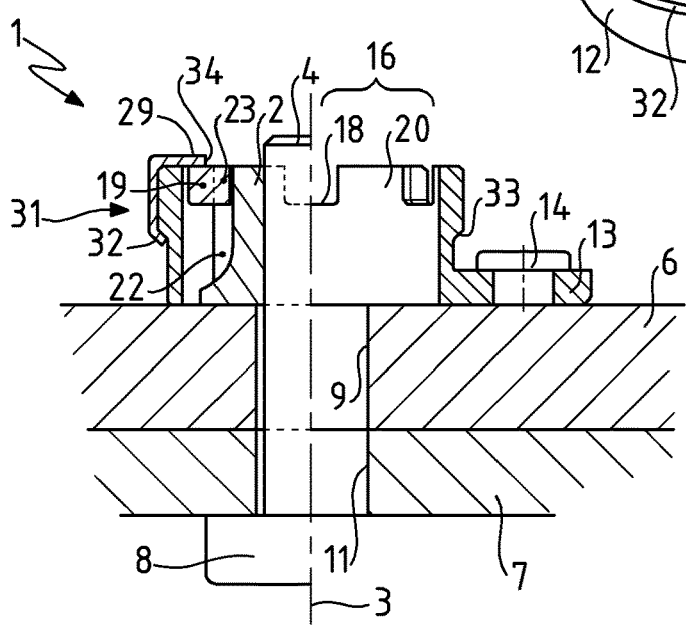
FIG. 3 is a view in axial section of the body installed on a part, the half-view on the left-hand side also showing the assembly in service.
Figure 4:
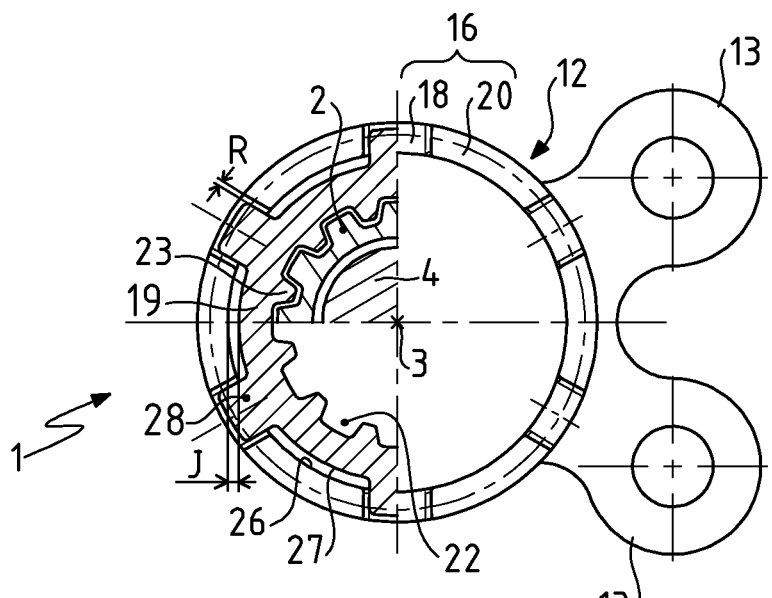
FIG. 4 is a top view in cross section, showing the body in the half view on the right-hand side, assembled with the intermediate element in the half-view on the left-hand side, the upper half of which also shows the nut as threaded member and the bolt screwed home in the nut.

The present description extends to any combination of features, even taken in isolation from one or more sentence (s) that are more complete and/or more generally than specifically described, in one and the same paragraph or in different paragraphs, provided that this combination achieves a technical effect and is differentiated from the prior art.

In the example shown in FIGS. 1 to 4, the retaining device serves to prevent the rotation of a nut 2 about the axis 3 thereof, in particular while a bolt 4 is being screwed, unscrewed or is in the state screwed home in this nut. The effect of the screwing is to tighten several parts together one against another, here two parts 6 and 7, in the axial direction between the nut 2 and the head 8 of the bolt 4. The part 6 adjacent to the nut is called the "part to be tightened"; this is for example a casing of an aircraft engine; the other part 7, adjacent to the head of the bolt 8, called for example "added part" is for example a component to be fastened on the casing of the engine, typically by several fastening systems each comprising a nut 2, a bolt 4 and a retaining device 1. The bolt 4 passes through a bore 9 of the part 6 to be tightened and a bore 11 of the added part 7. Owing to the manufacturing tolerances it is not always possible to align the bores 9 and 11 perfectly along the same screw axis 3, so that if the nut 2 were fixed to the part 6 to be tightened, screwing may be impossible. Moreover, in the applications more particularly targeted, the face of the part 6 to be tightened adjacent to the nut 2 is difficult or impossible to access. The retaining device 1 has the double function of preventing the nut 2 from turning, while allowing the nut 2 a certain margin of radial displacement so that the nut 2 is able to align axially with the bolt 4 even if the two bores 9, 11 have a certain misalignment, the diameter of at least one of the bores having a slight oversize, acceptable with respect to the aforementioned tolerances.

The nut 2 comprises on the radially outer circumference thereof a linking shape 22 with respect to the rotations about the screw axis 3. In the example shown, the linking shape is a standard shape, more particularly splines.

The retaining device 1 comprises a body 12 equipped with means for fastening to the part 6 to be tightened. In an embodiment, the fastening means are two lugs 13 extending radially outwards from the body 12 proper, and intended to be fastened to the part 6 to be tightened by rivets 14 (FIG. 3) which are merely sketched. The position of the lugs 13 about the axis 3 can vary from one embodiment to another, according to the space available on the surface of the part 6. The two lugs 13 may for example be radially opposite one another.

In the example shown, the body 12 has the shape of a cylindrical shaft open at both axial ends thereof, extending in service along the screw axis 3 or along an axis parallel to the axis 3 but slightly offset laterally with respect to the axis 3.

The body 12 is equipped with an anti-rotation shape 16 capable of preventing the rotation of the threaded member, here the nut 2, with respect to the part 6, while allowing radial clearance between the threaded member 2 and the body 12. In an embodiment where the body 12 has a cylindrical shaft, the anti-rotation shape is an alternation of notches 18 and protrusions 20 formed on the edge 17 of the shaft pointing away from the part 6 to be tightened.

Instead of a direct interaction between the body 12 and the nut 2, the retaining device moreover comprises an intermediate element 19 comprising:

a shape 23 complementary to the linking shape 22 of the nut 2, capable of producing a coupling opposing a relative rotation between the threaded member (nut 2) and the intermediate element 19, and coupling means 24 capable of producing, with the anti-rotation shape 16 of the body 12, a coupling with radial clearance opposing a relative rotation between the intermediate element 19 and the body 12.

Thus, the threaded member (nut 2) is prevented from turning with respect to the body 12 about an axis parallel to, or merged with, the axis 3. As the body 12 is itself fastened to the part 6 to be tightened, the threaded member (nut 2) is prevented from turning about such an axis with respect to the part 6 to be tightened. However, owing to the radial clearance of the intermediate element 19 with respect to the body 12, the threaded member 2 has freedom of radial displacement with respect to the part 6 to be tightened in order to self-centre on the bolt 4. The bolt is itself positioned by the bores 9 and 11 which, unlike what is shown diagrammatically, are generally slightly offset laterally with respect to one another, in particular on account of manufacturing tolerances.

Preferably, the coupling opposing a relative rotation between the threaded member 2 and the intermediate element 19 is substantially without radial clearance and without rotational clearance about the axis 3. Thus, the hold between the threaded member 2 and the intermediate element 19 perfectly meets the requirements for the application of the holding torque load on the nut 2 during screwing. The radial clearance is fully ensured farther apart from the axis, therefore under lower forces, between the intermediate element 19 and the body 12.

In the example selected here of a threaded member having splines as linking shape, the complementary shape is preferably a splined bore complementary to the splines of the threaded member (nut 2).

In particular, but non-limitatively, in the above example, the intermediate element 19 is preferably a ring. Preferably, the ring surrounds the threaded member (nut 2) and is surrounded by part of the body 12, in particular when the latter is produced in the form of a shaft as previously mentioned.

When the intermediate element is a ring, the coupling means of the intermediate element 19 with the body 12 can be formed on a radially outer surface 27 of the ring, said radially outer surface having said radial clearance J (FIG. 4) with a radially inner surface 26 of the body.

In certain embodiments such as that shown, the coupling means between the intermediate element 19 and the body 12 comprise radial teeth 28 which project into recesses, here notches 18, of a cylindrical wall which therefore in this example belongs to the body 12, the radial teeth here being borne by the intermediate element 19.

Even when the intermediate element 19 is off-centred to the maximum in the body 12, no tooth 28 can disengage from the recess thereof. In the example shown, this is obtained by a radial length of the teeth 28 which is greater than the diametral clearance 2J (double the radial clearance J).

Preferably, a face of the recesses, here the base of the notches 18, forms a stop limiting the axial movement of the intermediate element 19 towards the part 6 to be tightened. The axial movement of the intermediate element 19, in the example shown, is more precisely limited by the teeth 28 abutting the base of the notches 18.

Preferably, the coupling with radial clearance J between the intermediate element 19 and the body 12 also has rotational clearance R (FIG. 4) on one side and on the other side of an average relative angular position about the axis 1. This rotational clearance facilitates the radial displacement of the intermediate element 19 with respect to the body 12.

In the example shown, the splines of the nut 2 and of the ring 19 are more numerous, in particular twice as numerous, as the teeth 28 and the notches 18.

The drawings are typically on an enlarged scale, for example 2.5 scale. In such a case a radial clearance of the order of 0.5 mm (therefore 1 mm over the diameter) between the intermediate element 19 and the body 12 is suitable in certain applications. However, the invention is not limited to particular dimensionings.

Preferably, the device comprises axial retaining means holding the intermediate element captive in the body. In an example, these means comprise a stop 29 firmly fixed to the body 12 and retaining the intermediate element 19 on the side facing away from the part 6 to be tightened. The intermediate element 19 enjoys reduced axial clearance, but sufficient to allow the radial displacement thereof allowed by the radial clearance considered above, with respect to the body 12.

The stop can be borne by a cap 31 fastened to the body. In the example shown, this fastening is carried out by crimping the lower edge 32 thereof behind an oblique shoulder 33 of the body. In FIG. 1, the lower edge of the cap is shown in the conical form thereof after crimping, this edge being cylindrical before crimping.

The cap 31 typically comprises a central opening 34, surrounded by a flange forming the stop 29.

The retaining device is for example produced from Inconel alloy.

Figure 5:
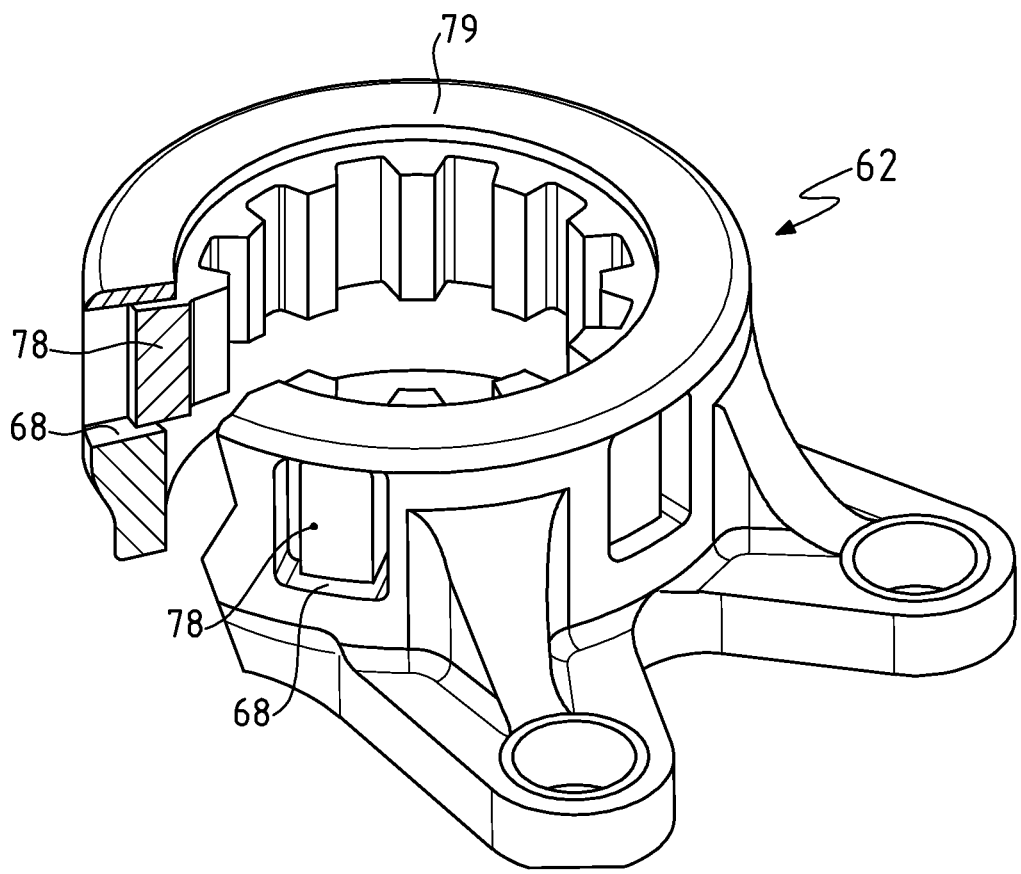
FIG. 5 is a perspective view, with cutaway and partial cross section, of the retaining device according to a second embodiment

The embodiment shown in FIG. 5 will only be described insofar as it differs from that of FIGS. 1 to 4 and the elements thereof that are similar to those of the embodiment in FIGS. 1 to 4 will be allocated a numerical reference increased by 50.

The stop 79 is made from a single piece with the body 62, and thus forms an integral part of the body 62. To this end, in an embodiment, the body 62 and the ring 69 are produced together by 3D printing, the ring 69 being obtained captive of the body 62. In an embodiment, the recesses 68 are windows which are axially closed, on their side remote from the part to be tightened, by the stop 79, instead of being as in the example of FIGS. 1 to 4, notches open on the side remote from the part, then closed by the cap 31, installation of which requires additional manufacturing steps.

The ring 69 is captive axially of the body 62, due to the fact that the teeth 78 are interposed between the stop 79 and the face of the windows which face this stop.

The teeth 78, similarly to the teeth 28 of the previous embodiment, are engaged in the windows 68 with sufficient freedom of movement to ensure the radial clearance proposed by the invention between the ring 69 and the body 62. However, still as in the previous embodiment, the teeth are sufficiently long radially so that they are not able to disengage from the windows 68, even in the case of maximum off-centring of the ring 69 in the body 62.

A structure similar to that in FIG. 5 can also be produced by MIM (metal injection moulding) using sintered agglomerated metallic powder, as offered in particular by the company Alliance MIM, Zi Foulottière, 22 rue de l'Europe, 25410 Saint-Vit, France.

Of course, the invention is not limited to the example described and shown. A nut with a standard linking shape may be a nut other than a splined nut, for example a hexagon nut, in which case the intermediate element may have as complementary shape a six-sided or twelve-sided cavity. The cap may be replaced by crimping a deformable part of the body, or also by a resilient lock ring of the circlip type, inserted into the bore of the body. If a cap is used, it may be fastened not by crimping, but for example by welding, in particular spot-welding, or also by shrinking. The body such as 12 may be crimped or also snapped onto the part such as 6, in which case the lugs such as 13 will not necessarily be present.

The invention claimed is:

1. A retaining device for a threaded member, in particular for a nut, for retaining said threaded member while it undergoes an operation of screwing or unscrewing along a screw axis, or while it is in the screwed condition, the threaded member having a linking shape with respect to the rotations about the axis and bearing at least indirectly on a part to be tightened by screwing action, the device comprising: a body intended to be fastened to the part and equipped with an anti-rotation shape capable of preventing rotation of the threaded member with respect to the part while allowing a radial clearance between the threaded member and the body, said retaining device moreover comprising an intermediate element provided with:

a shape complementary to the linking shape, capable of producing a coupling opposing a relative rotation between the threaded member and the intermediate element; and coupling means capable of producing, with the anti-rotation shape of the body a coupling with a radial clearance between the intermediate element and the body, the coupling means also configured for opposing a relative rotation between the intermediate element and the body.

2. The retaining device according to claim 1, characterized in that the coupling opposing a relative rotation between the threaded member and the intermediate element is substantially without radial clearance.

3. The retaining device according to claim 1, characterized in that the coupling opposing a relative rotation between the threaded member and the intermediate element is substantially without rotational clearance about the axis.

4. The retaining device according to claim 1, characterized in that the coupling with radial clearance also has a rotational clearance about the axis.

5. The retaining device according to claim 1, characterized in that the complementary shape is designed to ensure said coupling with a linking shape of a standard nut.

6. The retaining device according to claim 1, characterized in that the complementary shape is a splined bore.

7. The retaining device according to claim 1, characterized in that the intermediate element is a ring, in particular a ring substantially closed about the axis.

8. The retaining device according to claim 7, characterized in that the ring surrounds the threaded member and is surrounded by at least part of the body.

9. The retaining device according to claim 7, characterized in that the coupling means are formed on a radially outer surface of the ring, said radially outer surface having said radial clearance with a radially inner surface of the body.

10. The retaining device according to claim 1, characterized in that the coupling means comprise radial teeth projecting into recesses in a cylindrical wall.

11. The retaining device according to claim 10, characterized in that the teeth belong to the intermediate element.

12. The retaining device according to claim 11, characterized in that the recesses are notches formed in an edge of the cylindrical wall, said edge pointing away from the part.

13. The retaining device according to claim 11, characterized in that the recesses are closed at their two axial ends thereby to retain the intermediate element in the body against movements in both directions, axially.

14. The retaining device according to claim 10, characterized in that a face of the recesses forms a stop limiting the axial movement of the intermediate element towards the part to be tightened.

15. The retaining device according to claim 1, characterized by comprising axial retaining means retaining the intermediate element captive in the body.

16. The retaining device according to claim 15, characterized in that the axial retaining means comprise a stop firmly fixed to the body, retaining the intermediate element on its side facing away from the part to be tightened.

17. The retaining device according to claim 16, characterized in that the cap comprises a central opening.

18. The retaining device according to claim 15, characterized in that the stop is borne by a cap fastened to the body, preferably by crimping.

19. The retaining device according to claim 1, characterized in that the intermediate element is essentially not capable of deformation, in particular is inelastic.

* * * * *